United States Patent
Haruki et al.

(10) Patent No.: US 8,499,306 B2
(45) Date of Patent: Jul. 30, 2013

(54) MICROPROCESSOR CONFIGURED TO CONTROL A PROCESS IN ACCORDANCE WITH A REQUEST BASED ON TASK IDENTIFICATION INFORMATION AND THE REGISTER INFORMATION IDENTIFIER

(75) Inventors: Hiroyoshi Haruki, Kanagawa-ken (JP); Mikio Hashimoto, Kanagawa-ken (JP); Takeshi Kawabata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 286 days.

(21) Appl. No.: 12/926,251

(22) Filed: Nov. 4, 2010

(65) Prior Publication Data

US 2011/0107336 A1 May 5, 2011

Related U.S. Application Data

(62) Division of application No. 11/175,296, filed on Jul. 7, 2005, now Pat. No. 7,853,954.

(30) Foreign Application Priority Data

Jul. 7, 2004 (JP) ................................. 2004-200366

(51) Int. Cl.
*G06F 9/46* (2006.01)
*G06F 9/44* (2006.01)

(52) U.S. Cl.
USPC ........................................... 718/108; 712/228

(58) Field of Classification Search
None
See application file for complete search history.

(56) References Cited

U.S. PATENT DOCUMENTS

| 4,442,484 | A | 4/1984 | Childs et al. |
| 5,428,779 | A * | 6/1995 | Allegrucci et al. ........... 718/108 |
| 5,944,816 | A | 8/1999 | Dutton et al. |
| 6,707,736 | B2 | 3/2004 | Miyakawa et al. |
| 6,915,414 | B2 | 7/2005 | Yearsley et al. |
| 6,986,141 | B1 | 1/2006 | Diepstraten et al. |
| 7,191,313 | B2 | 3/2007 | Takamuki |
| 8,020,169 | B2 * | 9/2011 | Yamasaki ..................... 718/108 |
| 2001/0014157 | A1 | 8/2001 | Hashimoto et al. |
| 2001/0018736 | A1 | 8/2001 | Hashimoto et al. |

(Continued)

FOREIGN PATENT DOCUMENTS

| JP | 2-226458 | 9/1990 |
| JP | 4-266128 | 9/1992 |
| JP | 2001-230770 | 8/2001 |
| JP | 2003-150390 | 5/2003 |
| JP | 2004-178427 | 6/2004 |

OTHER PUBLICATIONS

Yamasaki, JP2004-220070, Translated Version, p. 1-20, Published May 8, 2004.*

(Continued)

*Primary Examiner* — Jennifer To
(74) *Attorney, Agent, or Firm* — Finnegan, Henderson, Farabow, Garrett & Dunner, L.L.P.

(57) ABSTRACT

A microprocessor executes programs in a pipeline architecture that includes a task register management unit that switches a value of a task register to second register information that is used when a second task is executed after the execution of a first task is completed, if a switch instruction to the second task is issued when a plurality of units executes the first task, and a task manager that switches a value of a task identification information register to a second task identifier after the value is switched to the second register information, and grants each of the plurality of units permission to execute the second task.

6 Claims, 14 Drawing Sheets

U.S. PATENT DOCUMENTS

| | | |
|---|---|---|
| 2002/0051536 A1 | 5/2002 | Shirakawa et al. |
| 2002/0053024 A1 | 5/2002 | Hashimoto et al. |
| 2002/0101995 A1 | 8/2002 | Hashimoto et al. |
| 2003/0033537 A1 | 2/2003 | Fujimoto et al. |
| 2003/0051123 A1 | 3/2003 | Takamuki |
| 2003/0126458 A1 | 7/2003 | Teramoto et al. |
| 2003/0182571 A1 | 9/2003 | Hashimoto et al. |
| 2004/0030911 A1 | 2/2004 | Isozaki et al. |
| 2004/0139341 A1 | 7/2004 | Yamaguchi et al. |
| 2004/0143748 A1 | 7/2004 | Yamaguchi et al. |
| 2005/0005088 A1 | 1/2005 | Yearsley et al. |
| 2005/0105738 A1 | 5/2005 | Hashimoto |
| 2005/0144438 A1 | 6/2005 | Hashimoto et al. |
| 2005/0289397 A1 | 12/2005 | Haruki et al. |
| 2006/0005260 A1 | 1/2006 | Haruki et al. |
| 2007/0022428 A1* | 1/2007 | Yamasaki .................... 718/108 |

OTHER PUBLICATIONS

Marr, T. D. et al., "Hyper-Threading Technology Architecture and Microarchitecture," Intel Technology Journal Q1, pp. 1-12, (2002).

Lie, D. et al., "Architectural Support for Copy and Tamper Resistant Software," Proceedings of ASPLOS 2000, 10 Sheets, (2002).

Notification of Reason(s) for Rejection issued by the Japanese Patent Office on Feb. 12, 2008, for Japanese Patent Application No. 2004-200366 and English-language translation thereof.

Notification of Reasons for Refusal issued by the Japanese Patent Office on Jul. 15, 2008, for Japanese Patent Application No. 2004-200366 and English-language translation thereof.

Lindh et al., "Fastchart—A Fast Time Deterministic CPU and Hardware Based Real-Time Kernel," IEEE (1991) pp. 36-40.

* cited by examiner

| TASK ID | PROGRAM KEY | DATA KEY | CONTEXT KEY |
|---|---|---|---|
| 1 | | | |
| 2 | | | |
| ... | | | |

| ADDRESS TAG | INSTRUCTION PROGRAM | TASK ID |
|---|---|---|
|  |  |  |
|  |  |  |
|  |  |  |

FIG. 3

MICROPROCESSOR CONFIGURED TO CONTROL A PROCESS IN ACCORDANCE WITH A REQUEST BASED ON TASK IDENTIFICATION INFORMATION AND THE REGISTER INFORMATION IDENTIFIER

CROSS-REFERENCE TO RELATED APPLICATIONS

This is a division of application Ser. No. 11/175,296, filed Jul. 7, 2005, now U.S. Pat. No. 7,853,954 which is incorporated herein by reference.

This application is based upon and claims the benefit of priority from the prior Japanese Patent Application No. 2004-200366, filed on Jul. 7, 2004, the entire contents of which are incorporated herein by reference.

BACKGROUND OF THE INVENTION

1. Field of the Invention

The present invention relates to a microprocessor for executing program tasks in a pipeline architecture.

2. Description of the Related Art

Recently, in an open system that is generally used, hardware, components constituting computers for common users, such as Personal Computers (PCs) or source codes of an Operating System (OS) are disclosed. Accordingly, end users can modify the OS using these disclosed contents.

Meanwhile, in most application programs operating on the open system, it is required to secure a copyright on information regarding the application programs or a copyright on the application programs themselves. For this reason, there is a need for a structure in which secrecy of application programs is preserved, i.e., a structure in which attack on application programs is prevented. Although an OS is configured to protect against attacks on application programs, it is impossible to prevent attack on application programs in the case where the OS is modified. In view of this, there is a need for hardware that can preserve the secrecy of the application programs. Generally, third party violators will find it more difficult in modifying the hardware rather than modifying an OS.

As a kind of hardware having the above characteristics, in particular, a microprocessor, a tamper-resistant processor was proposed in, for example, JP-A-2001-230770. The tamper-resistant processor has the function of encrypting programs, and information used in the programs in an multi-task environment. This can prevent programs or information from leaking to a third party, or programs, etc. from being modified.

Further, recently, there has been disclosed a technique in which, in order to effectively utilize an execution resources of a microprocessor, when there is a stalling time of memory access, an instruction switches to an other thread and is then executed, thus obviating stalling time and improving the throughput. As an example of the technique, for example, Deborah T. Marr et al., Hyper-Threading Technology Architecture and Microarchitecture, Intel Technology Journal (February, 2002) disclose Hyper-Threading Technology in which one physical processor is recognized as two logical processors.

In these techniques, the execution resources is shared between the logical processors, but necessary resources, such as registers or Translation Look-aside Buffer (TLB), are provided in each of the processors. Further, as threads are switched, adequate resources are selected. Furthermore, during the stalling time of memory access, threads, which are not the threads that have to wait, still operate. In other times, respective threads are alternately executed.

In order to execute the above-described process, this technique includes a register renaming function for converting a register number written into an instruction file into a physical register number. Furthermore, each of the logical processors has a Register Alias Table (RAT) for renaming registers.

In order to realize secret protection of tasks, it is necessary to prohibit other tasks from illegally making reference to resources of one protected task, such as registers or memories. For example, an attacker can have access to a task subject to be protected using an OS.

Accordingly, a processor core controls the hardware to save the contents of a task before interrupt/resume, and to recover the contents of a task after interrupt/resume, if an interrupt/task resume instruction is issued. At the same time, the processor core updates the value of a task ID register. This can prevent other tasks from having access to the contents of a register set of a protected task or memory information.

However, most high-performance processors have a pipeline configuration in which plural instructions are processed and executed in parallel. In the pipeline, there is a period where instructions belonging to respective tasks before and after interrupt/resume are mixed.

If processor core reads/writes a register during the period in which instructions are mixed, it is impossible to control the contents of a register of a protected task in a safe and proper manner. For example, if switching of a register set is performed immediately after an interrupt is generated, there occurs a case where a task, which should be processed before the interrupt is generated, is interrupted and is written on a register of a task after the interrupt is generated.

Furthermore, if the value of the task ID register is updated right after the interrupt is generated, there occurs a case where the task before the interrupt performs cache access or memory access using the value of the task ID register after the interrupt. Further, by having access to the cache or memory using other task ID, read and write operations are executed according to a value that is encrypted/decrypted by a key different from a key corresponding to a task.

Furthermore, as a method of executing the switching of a register set corresponding to a task, there may be a method in which the RAT is maintained in each task using the register renaming function used to effectively utilize the physical execution resources in the Hyper-Threading Technology, etc.

Even if this technique is employed, since a task ID register is only one, there occurs a case where a value of the task ID register does not match a value of a task ID register before interrupt/resume or after interrupt/resume when the task before interrupt/resume and the task after interrupt/resume coexist. Accordingly, there is a problem in that it is impossible to prevent cache access or memory access using other task ID registers.

BRIEF SUMMARY OF THE INVENTION

According to some embodiments of the present invention, a microprocessor comprises a pipeline, having a plurality of units, configured to process tasks; a task identification register configured to hold current task identification information; a task register configured to hold register information which is used when the plurality of units processes a task; a task completion detector configured to detect that the pipeline completes processing a first task which is already entered in an execution unit among the plurality of units of the pipeline, if a switch instruction to a second task is issued while the execution unit executes the first task; a task register manager configured to switch values of the task register to second register information, which is used when the second task is executed, if the task completion detector detects that the pipeline completes processing a first task; and a task manager configured to switch a value of the task identification information register to a second task identification information to identify the second task and to grant each of the units permission to execute the second task, if the task register manager switches to the second register information.

According to some embodiments of the present invention, a microprocessor configured to execute programs in a pipeline architecture, comprises a plurality of units configured to execute tasks; a task identification information register configured to hold task identification information, which identifies the task executed by each of the units, in a format through which a corresponding unit can be identified; a task identification information specifying device configured to specify the task identification information that is held in the task identification information register for the units, if a predetermined processing request is received from the units; and a controller configured to control a process in accordance with the processing request based on the task identification information specified by the task identification information specifying device.

According to some embodiments of the present invention, a microprocessor configured to execute programs in a pipeline architecture, comprises a plurality of units configured to execute tasks; a register information register configured to hold a register information identifier, which identifies a register set used by each of the units, in a format through which a corresponding unit can be identified; a register information identification specifying device configured to specify the register information identifier that is held in the register information identification register for the units, if a predetermined processing request is received from the units; and a controller configured to control a process in accordance with a memory access processing request, based on the register information identifier specified by the register information identification specifying device.

According to some embodiments of the present invention, a method, comprises processing tasks in a pipeline having a plurality of units; holding a current task identification information in a task identification register; holding register information in a task register; detecting whether the pipeline completes processing a first task that has already entered an execution unit among the plurality of units of the pipeline if a switch instruction to a second task is issued while the execution unit executes the first task; switching values of the task register to a second register information, which is used when the second task is executed; and switching values of the task identification information register to a second task identification information to identify the second task and to grant each of the units permission to execute the second task.

According to some embodiments of the present invention, a method comprises executing tasks at a plurality of units; holding, in a task identification information register, task identification information, which identifies the task executed by each of the units, in a format through which a corresponding unit can be identified; specifying, in a task identification information specifying device, the task identification information that is held in the task identification information register for the units, if a predetermined processing request is received from the units; and controlling, in a controller, a process in accordance with the processing request based on the task identification information specified by the task identification information specifying device.

According to some embodiments of the present invention, a method comprises executing tasks at a plurality of units; holding, in a register information identification register, a register information identifier, which identifies a register set used by each of the units, in a format through which a corresponding unit can be identified; specifying the register information identifier that is held in the register information identification register for the units, if a predetermined processing request is received from the units; and controlling, at a controller, a process in accordance with a memory access processing request, based on the specified register information identifier.

BRIEF DESCRIPTION OF THE SEVERAL VIEWS OF THE DRAWINGS

FIG. 2 is a diagram illustrating the data configuration of a key table 142.

FIG. 3 is a diagram illustrating the data configuration of an instruction cache 122.

DETAILED DESCRIPTION OF THE INVENTION

Figure 1:
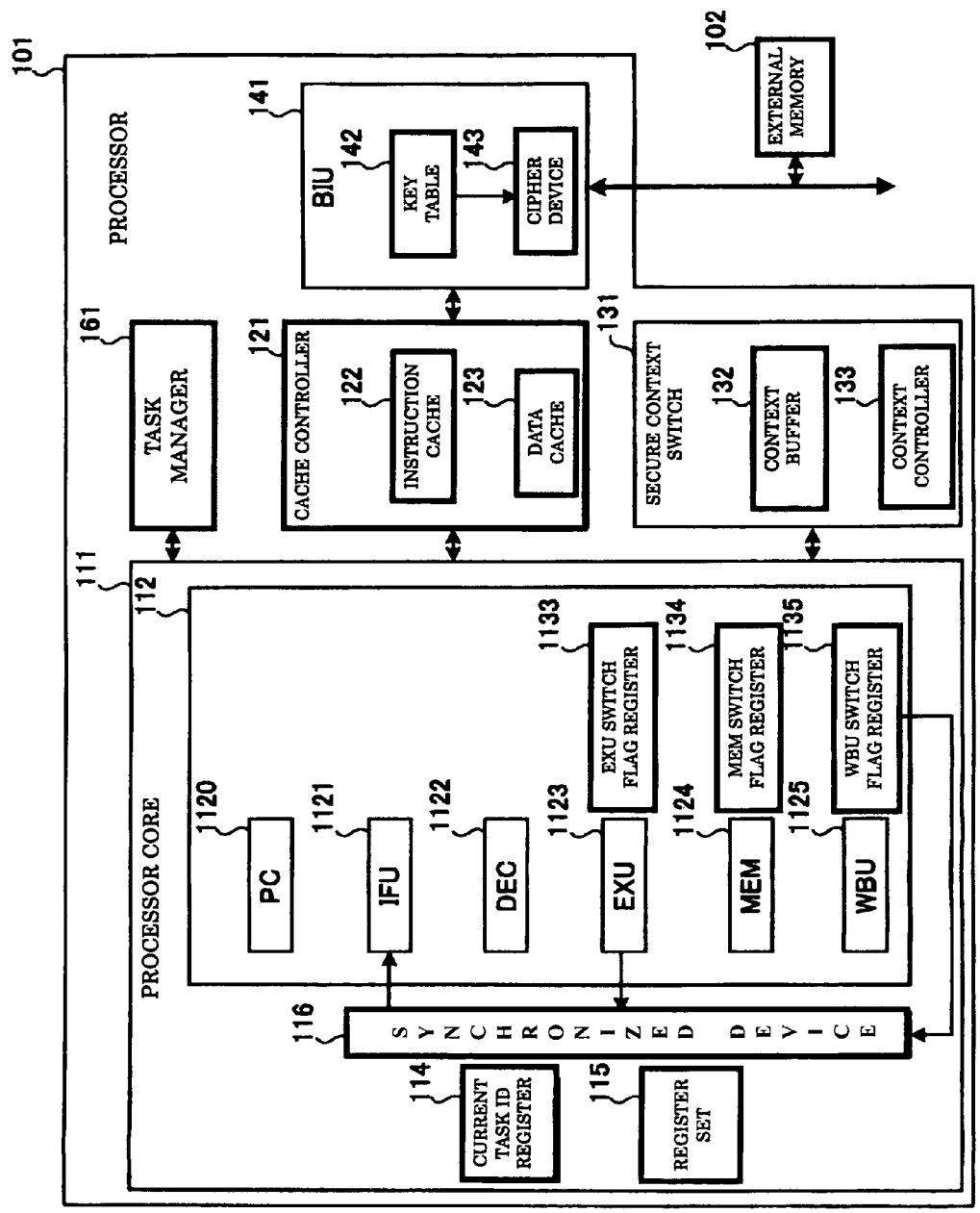
FIG. 1 is a block diagram showing the overall configuration of a microprocessor according to some embodiments.

FIG. 1 is a block diagram showing the overall configuration of a microprocessor 101 according to some embodiments. The processor 101 includes a processor core 111, a cache controller 121, a secure context switch 131, a Bus Interface Unit (BIU) 141 and a task manager 161.

The BIU 141 includes a key table 142 and an cipher device 143. The BIU 141 acquires a task ID and an access type from the cache controller 121. In this case, the task ID refers to identification information to identify a task that will be executed by the processor core 111. Further, the access type refers to identification information to identify whether information subject to be accessed is a program or data.

FIG. 2 is a diagram illustrating the data configuration of the key table 142. The key table 142 includes program keys, data keys, and context keys being cipher keys for respectively encrypting/decrypting programs, data, and context, corresponding task IDs.

The BIU 141 serves to select a cipher key based on a task ID and an access type, which are obtained from the cache controller 121, using the key table 142. The BIU 141 also encrypts or decrypts corresponding programs or data using the selected cipher keys, and outputs decrypted instruction or data to the cache controller 121.

The cache controller 121 includes an instruction cache 122 and a data cache 123. The cache controller 121 acquires an instruction or data through the BIU 141 according to a request from the processor core 111.

Figure 3:
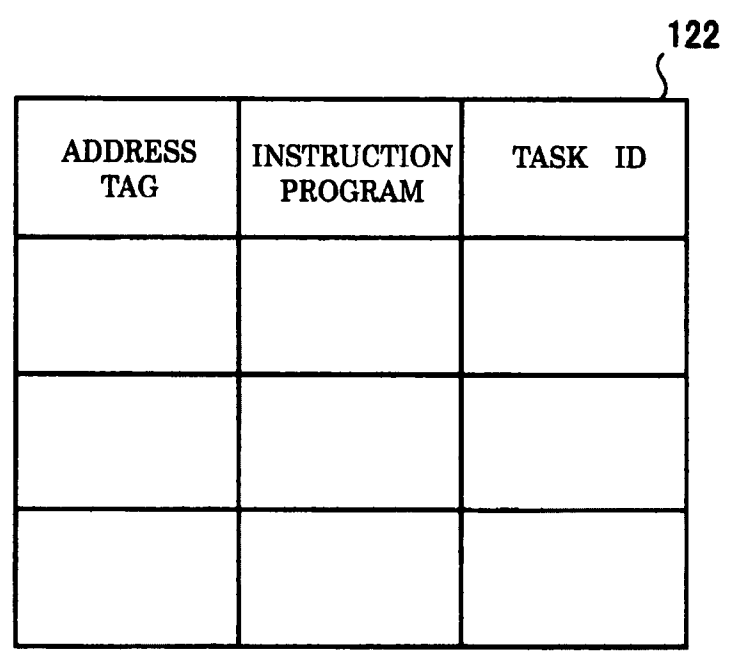

The instruction cache 122 receives an instruction of a plain text that is acquired from the BIU 141. FIG. 3 is a diagram illustrating the data configuration of the instruction cache 122. The instruction cache 122 stores a task ID tag and an address tag corresponding to an instruction. The task ID tag refers to identification information of a task depending upon decryption of the corresponding instruction. In this case, the address tag refers to information indicating an address where the corresponding instruction is stored. The instruction cache 122 also controls access to each instruction based on an address or a task ID.

The data cache 123 stores a task ID corresponding to data of a plain text that is acquired from the BIU 141. The data configuration of the data cache 123 is the same as that of the instruction cache 122 which has been described with reference to FIG. 3. The data cache 123 also controls access to each instruction based on an address or a task ID.

Reference will be made back to FIG. 1. The processor core 111 includes a 5-stage pipeline 112, a synchronized device 116, a current task ID register 114 and a register set 115.

The current task ID register 114 stores identification information of a task that is being executed in the 5-stage pipeline 112. The register set 115 has information to be used by a task that is being executed in the 5-stage pipeline 112.

The 5-stage pipeline 112 includes a program counter (PC) 1120, an instruction fetch unit (IFU) 1121, a decode unit (DEC) 1122, an execution unit (EXU) 1123, a memory access unit (MEM) 1124 and a writeback unit (WBU) 1125. The 5-stage pipeline 112 further includes an EXU switch flag register 1133, a MEM switch flag register 1134, and a WBU switch flag register 1135. The 5-stage pipeline 112 acquires an instruction from the cache controller 121, and executes the acquired instruction.

The program counter 1120 has an address of an instruction fetch destination. The instruction fetch unit 1121 fetches an instruction pointed by an address that is stored in the program counter 1120. The decode unit 1122 decodes the fetched instruction. The execution unit 1123 executes the instruction that is decoded by the decode unit 1122. The memory access unit 1124 has access to the cache controller 121 on the basis of the execution results of the execution unit 1123, and loads/stores data therefrom/thereto. The writeback unit 1125 writes the data into the register set 115.

Switch flags are set in the EXU switch flag register 1133, the MEM switch flag register 1134 and the WBU switch flag register 1135 corresponding to tasks, respectively, which are processed by the units the EXU 1123, the MEM 1124, and the WBU 1125 of the pipeline. The switch flags have two values: 0 and 1. The switch flag '1' indicates a last instruction before switching in the case where a task is switched.

For example, the EXU switch flag register 1133 can be set to a switch flag '1' upon interrupt and when a task resumes.

Further, the contents of a switch flag set in the EXU switch register 1133 are moved to the MEM switch flag register 1134 and the WBU switch flag register 1135 in interlock with the pipeline. That is, it is possible to determine whether a task before an interrupt has been completed, depending upon whether the switch flag of the WBU switch flag register 1135 is '1' or '0'.

Figure 4:
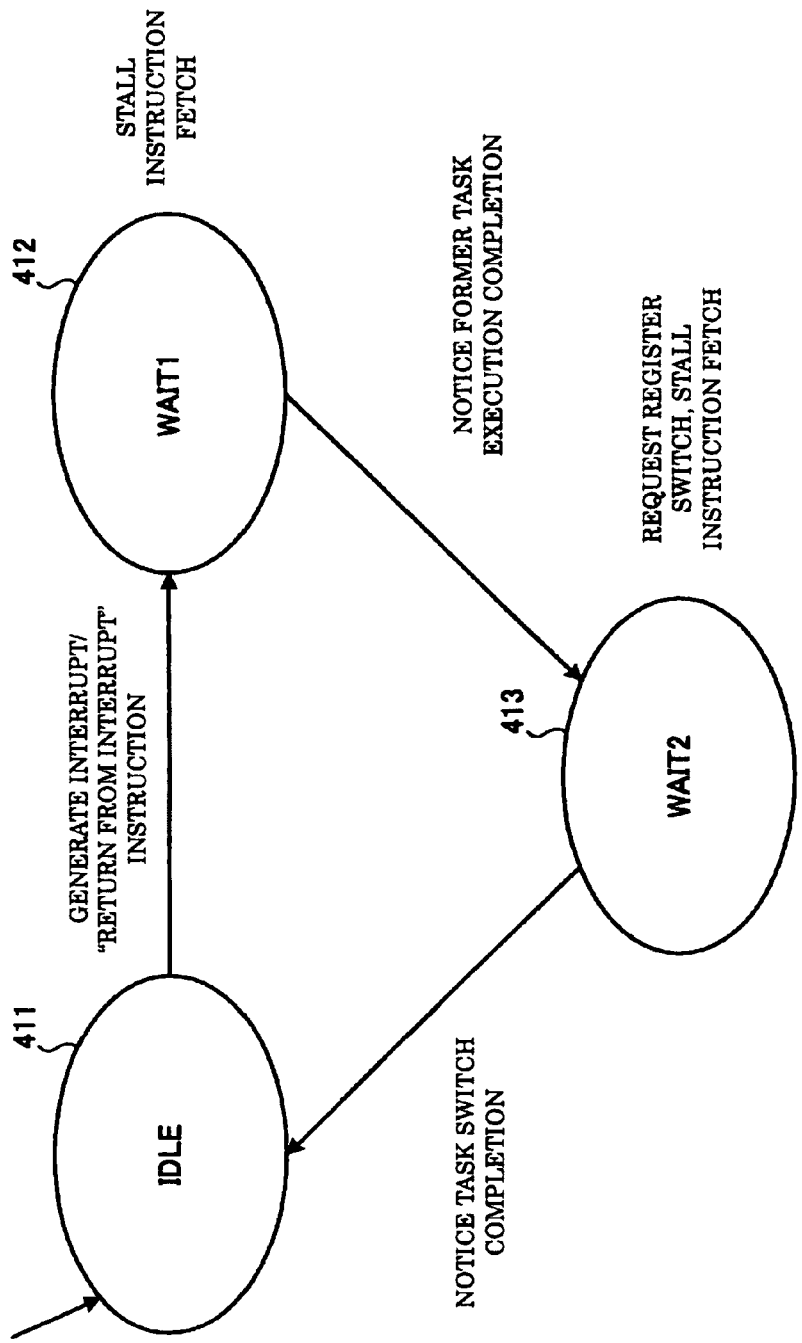
FIG. 4 shows a state transition diagram of a synchronized device 116.

FIG. 4 shows a state transition diagram of the synchronized device 116. The synchronized device 116 can transition among an IDLE state 411, a WAIT1 state 412 and a WAIT2 state 413. The synchronized device 116 takes synchronization of each of the units in each state.

If an interrupt is generated or a task resume instruction is issued, the synchronized device 116 transitions from the IDLE state 411 to the WAIT1 state 412. At this time, the synchronized device 116 requests the instruction fetch unit 1121 to stall an instruction fetch. That is, the synchronized device 116 prohibits the instruction fetch unit 1121 from reading a task depending upon the interrupt or the task resume instruction.

Furthermore, if a task execution completion notice is received, the synchronized device 116 transitions from the WAIT1 state 412 to the WAIT2 state 413. At this time, the synchronized device 116 outputs a register switch request to switch the value of the register set 115 to the secure context switch unit 131.

Furthermore, if a task switching completion notice is received, the synchronized device 116 transitions from the WAIT2 state 413 to the IDLE state 411. At this time, the synchronized device 116 stops requesting the instruction fetch unit 1121 to stall an instruction fetch. The task manager 161 also sets a task ID of a task after switching in the current task ID register 114.

The secure context switch unit 131 includes a context buffer 132 for buffering a context, and a context controller 133 that executes control between the register sets 115. The context controller 133 reads the register set 115 of the processor core 111 according to a register switch request made by the synchronized device 116, and controls the read contents to be stored in the context buffer 132. The context controller 133 further returns a context corresponding a task after interrupt/return from the context buffer 132 to the register set 115 of the processor core 111.

The task manager 161 manages tasks that are executed by the processor core 111. The task manager 161 also sets a task ID in the current task ID register 114 in the case where the contents of a register are completely switched.

Hereinafter, a process of the processor 101 in the case where an interrupt is generated when a protected task 1 is being executed in the 5-stage pipeline 112 will be described.

Figure 5:
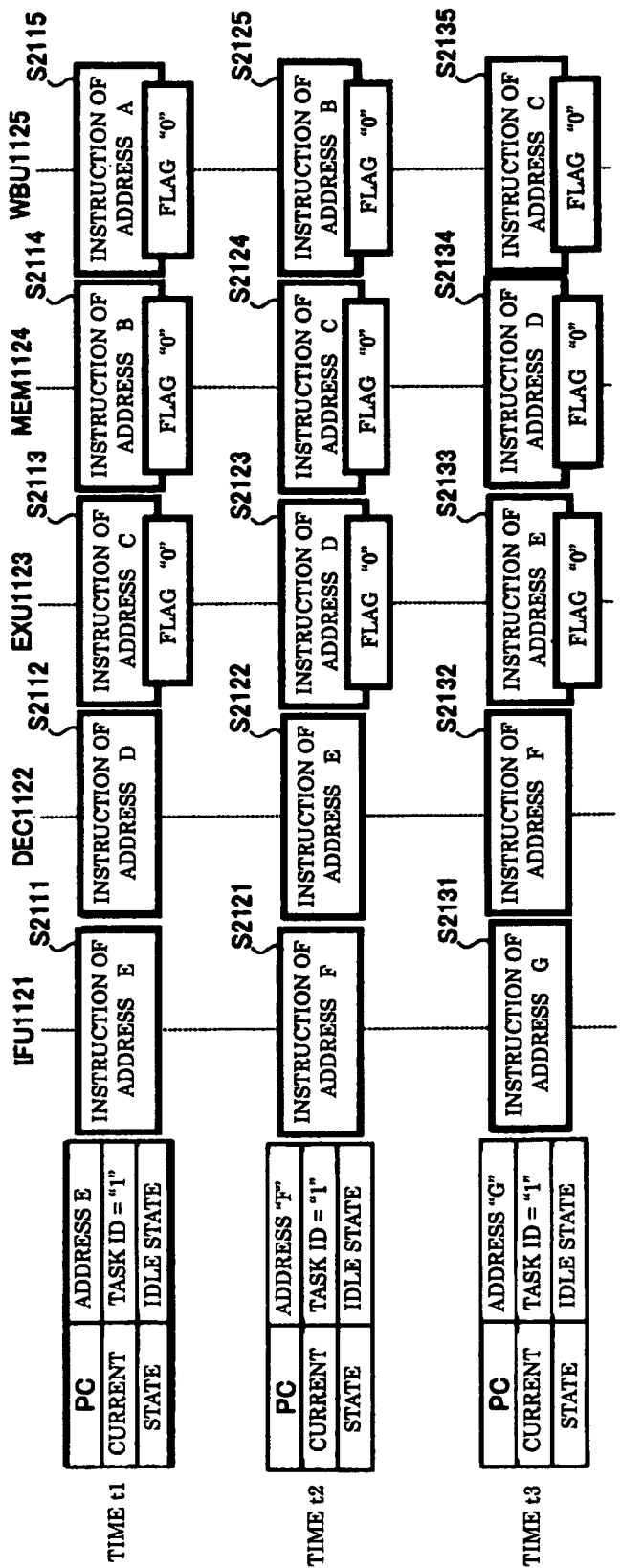
FIG. 5 is a diagram illustrating a state where a 5-stage pipeline 112 executes a first protected task.

FIG. 5 is a diagram illustrating a state where a 5-stage pipeline 112 executes the protected task 1. In FIG. 5, on the left side are shown values of the program counter 1120, values of the current task ID register 114 and states of the synchronized device 116 at each time.

First, the processor core 111 allows the state of the synchronized device 116 to be in the IDLE state 411 in an initialization process. If the execution of the protected task 1 begins, the task manager 161 sets '1' in the current task ID register 114 and a start address in the program counter 1120. In this case, the task ID '1' is a task ID to identify the protected task 1.

At a time t1 shown in FIG. 5, the program counter 1120 is an address E, and a value of the current task ID register is 1. The instruction fetch unit 1121 sends a read request for an instruction of the protected task 1, which exists in the address E, to the cache controller 121 by referring to the value of the program counter 1120 and the current task ID register 114, and fetches the instruction (step S2111).

The decode unit 1122 then decodes the instruction of the protected task 1 of an address D, which is fetched at a time before the time t1 (step S2112). Next, the execution unit 1123 executes an instruction, which is decoded at a time before the time t1, of the protected task 1 corresponding to an address C (step S2113). The memory access unit 1124 then has access to a memory and loads/stores information from the memory based on the execution results of the instruction of the protected task 1 corresponding to an address B, which is executed at a time before the time t1 (step S2114).

The writeback unit 1125 writes the information into the register set 115 based on the execution results of the instruction of the protected task 1 corresponding to the address A at the time one before the time t1. As such, if the process of the writeback unit 1125 being the last unit of the pipeline is completed, the execution of the protected task 1 corresponding to an address A is completed (step S2115).

At a time t2, the program counter 1120 changes to an address F. Then, the instruction fetch unit 1121 reads an instruction of a protected task, which exists in the address F (step S2121). The decode unit 1122, the execution unit 1123 and the memory access unit 1124 then execute respective processes, and each of the instructions moves to a next stage of the pipeline (step S2122 to step S2124). The writeback unit 1125 completes the execution of an instruction of a protected task 1 corresponding to an address B (step S2125). In a similar manner, after a time t3, each of the units executes a task according to a value set in a program counter.

Figure 6:
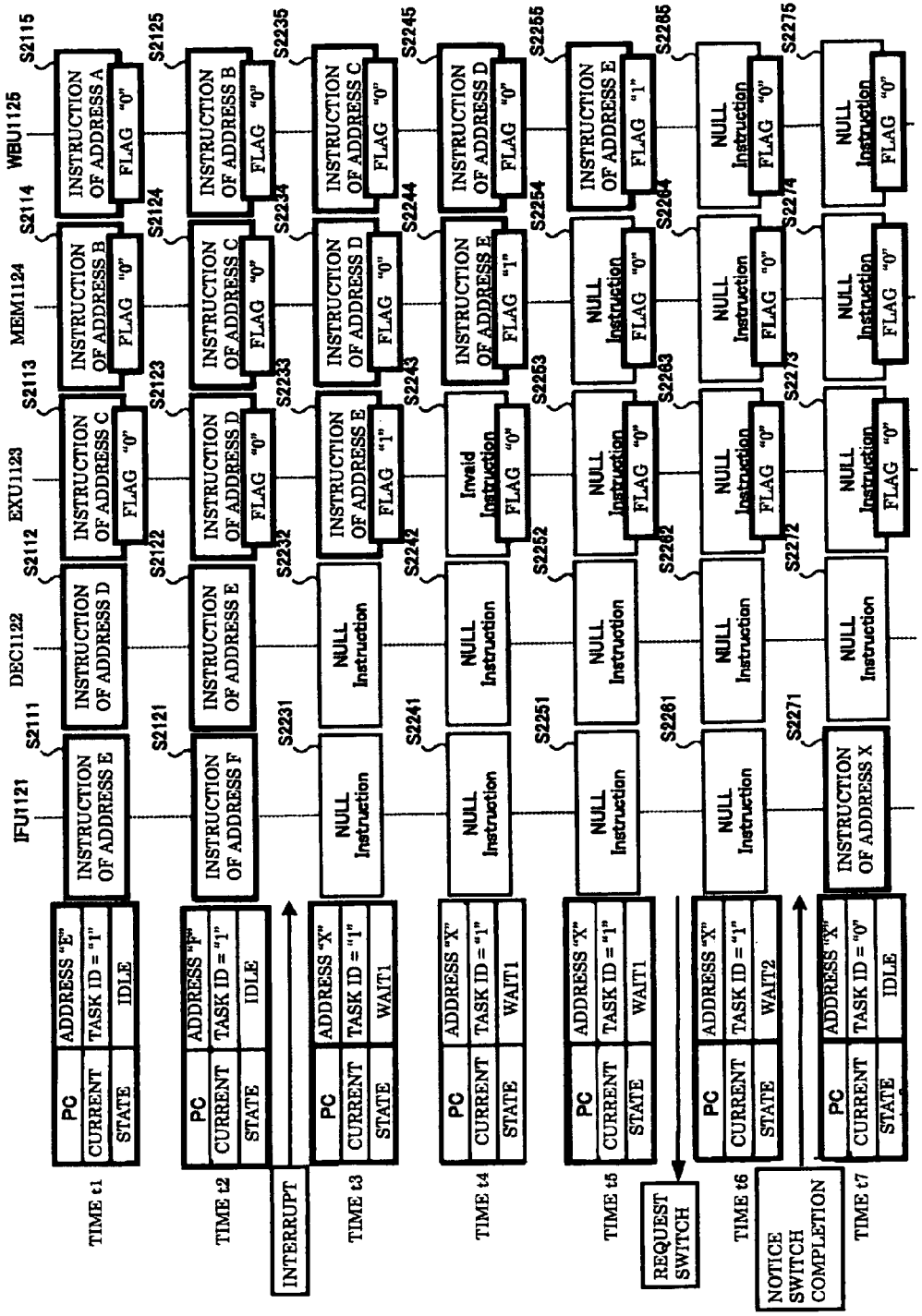
FIG. 6 is a diagram illustrating a state where the 5-stage pipeline 112 executes a task when an interrupt is generated.

FIG. 6 is a diagram illustrating a state where the 5-stage pipeline 112 executes a task in the case where an interrupt is generated for whatever reason, before the process at a time t3, which has been described with reference to FIG. 5, begins. In this case, it is assumed that a protected task 1, which is being executed before the interrupt, is referred to as a former task, and a task relating to an interrupt that is generated is referred to as a latter task.

In this case, the 5-stage pipeline 112 sets a head address X of an interrupt handler of an OS in the program counter 1120 at the time t3. Further, the processor core 111 invalidates instructions that are set in the instruction fetch unit 1121 and the decode unit 1122 (step S2231, step S2232).

Furthermore, the 5-stage pipeline 112 sets '1' in the EXU switch flag register 1133 corresponding to the execution unit 1123 (step S2233). The switch flag '1' indicates the last instruction in the former task. Further, the switch flag '1' transfers to the memory access unit 1124 and the writeback unit 1125 in interlock with the pipeline.

Figure 7:
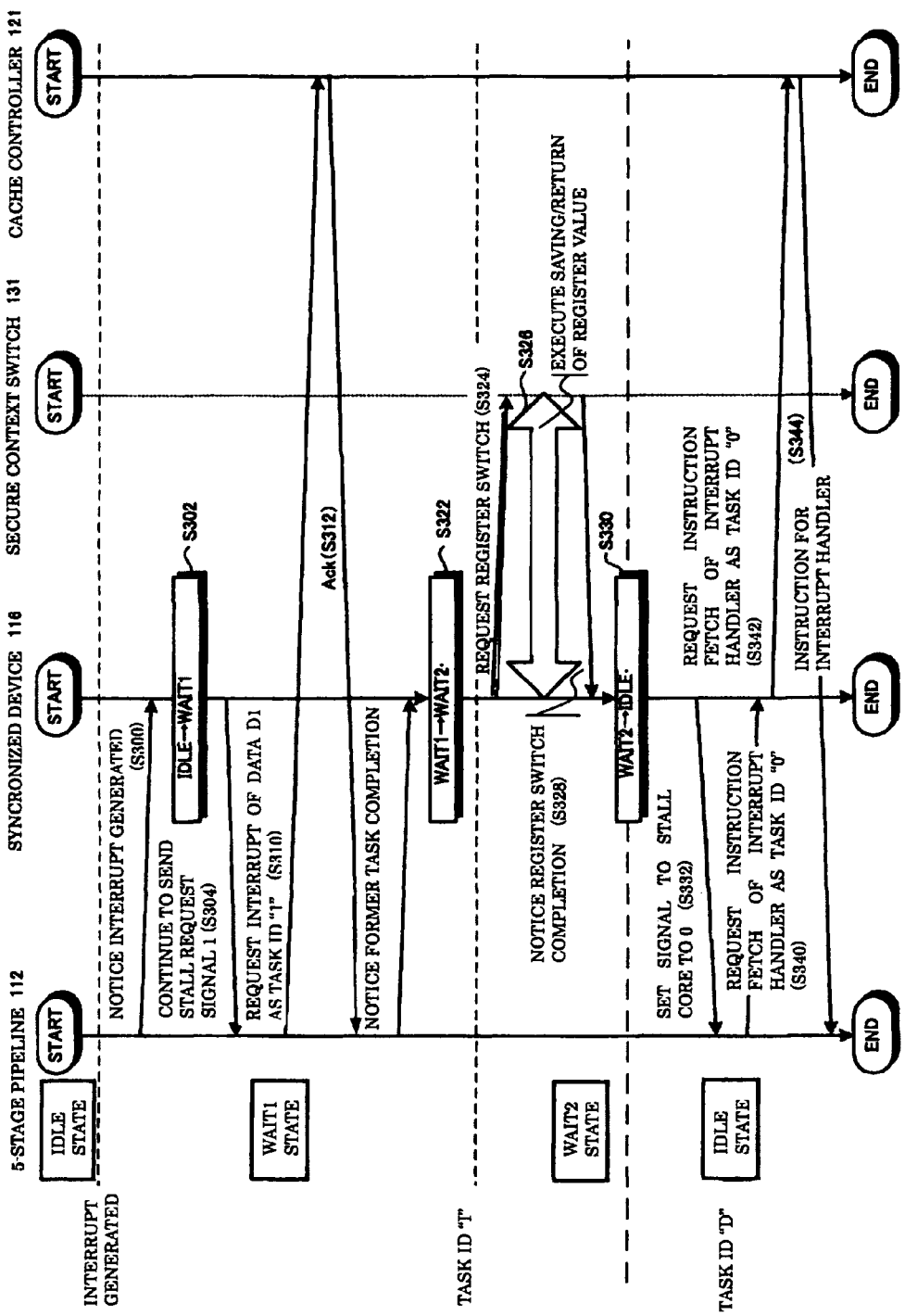
FIG. 7 is a flowchart illustrating a process of each of the 5-stage pipeline 112, the synchronized device 116, the secure context switch unit 131, and the cache controller 121 when an interrupt is generated.

The process of each of the 5-stage pipeline 112, the synchronized device 116, the secure context switch unit 131, and the cache controller 121, when an interrupt is generated, will be described below. FIG. 7 is a flowchart illustrating the process of each of the 5-stage pipeline 112, the synchronized device 116, the secure context switch unit 131, and the cache controller 121 when an interrupt is generated.

If an interrupt is generated, the 5-stage pipeline 112 informs the synchronized device 116 of the fact that the interrupt has been generated (step S300). The synchronized device 116 transfers from the IDLE state 411 to the WAIT1 state 412 according to the state transition diagram of FIG. 4 (step S302). The synchronized device 116 then requests the instruction fetch unit 1121 to stall an instruction fetch (step S304). The request of stalling an instruction fetch is executed until the state returns to the IDLE state 411.

Furthermore, the task manager 161 updates the program counter 1120 simultaneously when the generation of the interrupt is noticed. The instruction fetch unit 1121 tries to execute an instruction fetch request to the latter task. However, since the synchronized device 116 has already acquired the request of stalling an instruction fetch in step S304, the 5-stage pipeline 112 waits for instruction fetch.

Since the instruction fetch unit 1121 cannot perform the instruction fetch to the latter task due to the request of stalling an instruction fetch, it fills the pipeline with a NULL instruction without operating the program counter 1120, and then executes an instruction of a former task remaining in the pipeline, at the time t3 of FIG. 6 (step S2231, step S2241, step S2251). In this case, the NULL instruction is an instruction that does not exert influence on registers or memories even if it is executed.

In FIG. 7, if the former task remaining in the 5-stage pipeline 112 is a data store instruction, the 5-stage pipeline 112 specifies a task ID '1', and sends a memory write request of data D1 to the cache controller 121 (step S310). The cache controller 121 returns ACK to the processor core 111 after it completely writes data into the data cache 123 (step S312).

At a time t5 of FIG. 6, an instruction corresponding to a switch flag '1' reaches the writeback unit 1125. This causes the execution of the former task to be completed, and allows the register set 115 to be switched (step S2251 to step S2255).

At this time, in FIG. 7, the 5-stage pipeline 112 sends a former task execution completion notice to the synchronized device 116 (step S320). The synchronized device 116 then transitions from the WAIT1 state 412 to the WAIT2 state 413 according to the state transition diagram of FIG. 4 (step S322). The synchronized device 116 then sends a register switch request to the secure context switch unit 131 (step S324).

The secure context switch unit 131 reads a context from the register set 115, and saves the context in the context buffer 132. Or, the secure context switch unit 131 encrypts the value and saves the register in the external memory 102. The secure context switch unit 131 further recovers a context, which is read from the external memory 102 and then decrypted, or a context, which is read from the context buffer 132, to the register set 115 (step S326).

If the switching of the value of the register is completed, the secure context switch unit 131 sends a register switch completion notice to the synchronized device 116 (step S328). The synchronized device 116 then transitions from the WAIT2 state 413 to the IDLE state 411 according to the state transition diagram of FIG. 4 (step S330). The synchronized device 116 then requests the instruction fetch unit 1121 to stop stalling instruction fetch (step S332). At this time, the task manager 161 sets '0' in the current task ID register 114. In this case, the task ID '0' is a task ID of a task related to an interrupt, i.e., a latter task.

As shown at a time t6 of FIG. 6, the instruction fetch unit 1121 continues to set the NULL instruction as long as there is the request of stalling an instruction fetch (step S2261 to step S2265). Further, if the switch completion notice is issued and the request of stalling an instruction fetch disappears, the instruction fetch unit 1121 specifies the current task ID '0' and sends an instruction read request for corresponding to an address X to the synchronized device 116, as shown at a time t7 of FIG. 6 (step S2271 to step S2275).

If the instruction fetch unit 1121 outputs the instruction read request for the address X, the synchronized device 116 receives a request of an instruction fetch from the 5-stage pipeline 112 (step S340), and sends an instruction read request to the cache controller 121 (step S342), as shown in FIG. 7. If an instruction disappears in the address X within the cache, the cache controller 121 reads an instruction of a plain text from the external memory 102 via the BIU 141, and writes the read instruction to the cache. The cache controller 121 then sends the instruction that is read from the cache to the 5 stage pipeline 112 at the processor core 111 (step S344). The interrupt process is thus completed.

As such, the processor core 111 according to some embodiments, controls instruction fetch of a latter task to be in a standby state, until the execution of a former task that is already registered in the 5-stage pipeline 112 before an interrupt is completed and register information of the former task and register information of the latter task are switched. This can prevent other tasks from attempting register access.

Further, the current task ID is switched simultaneously when the switching of register information is completed. Thus, since cache access can be executed according to a task ID corresponding to a task, access control can be performed in an effective way by the cache controller 121.

It is thus possible to protect register information of a task subject to be protected or a memory region from an OS or a task.

Further, since processes, such as switching of a value of a register or switching of a current task ID for an interrupt request, can be all preformed by hardware, it is possible to prevent a third party from reading register information, memory information, and the like through an OS.

The process in the case where an interrupt is generated has been described so far with reference to FIGS. 6 and 7. A recovery process in the case where a resume instruction of a task is issued after an interrupt is generated is also the same as that which has been described with reference to FIG. 6.

Further, in some embodiments, the case where the pipeline 112 having five stages has been described. It is, however, to be understood that the stage number of the pipeline is not limited thereto, but can be greater than or smaller than 5.

Furthermore, in some embodiments, it has been described that the processor core 111 has one register set 115. It is however to be noted that the processor core 111 can have a plurality of the register sets 115. In the event that the processor core 111 has a plurality of the register sets 115, a register value of a latter task after switching can be returned to an additional register set in advance, and the register set can be switched after a former task, which is being executed before switching, is completely executed. This makes it unnecessary to save or recover a register while a task is being switched. Therefore, a stall time incurred by saving and recovering of a register set can be saved.

Figure 8:
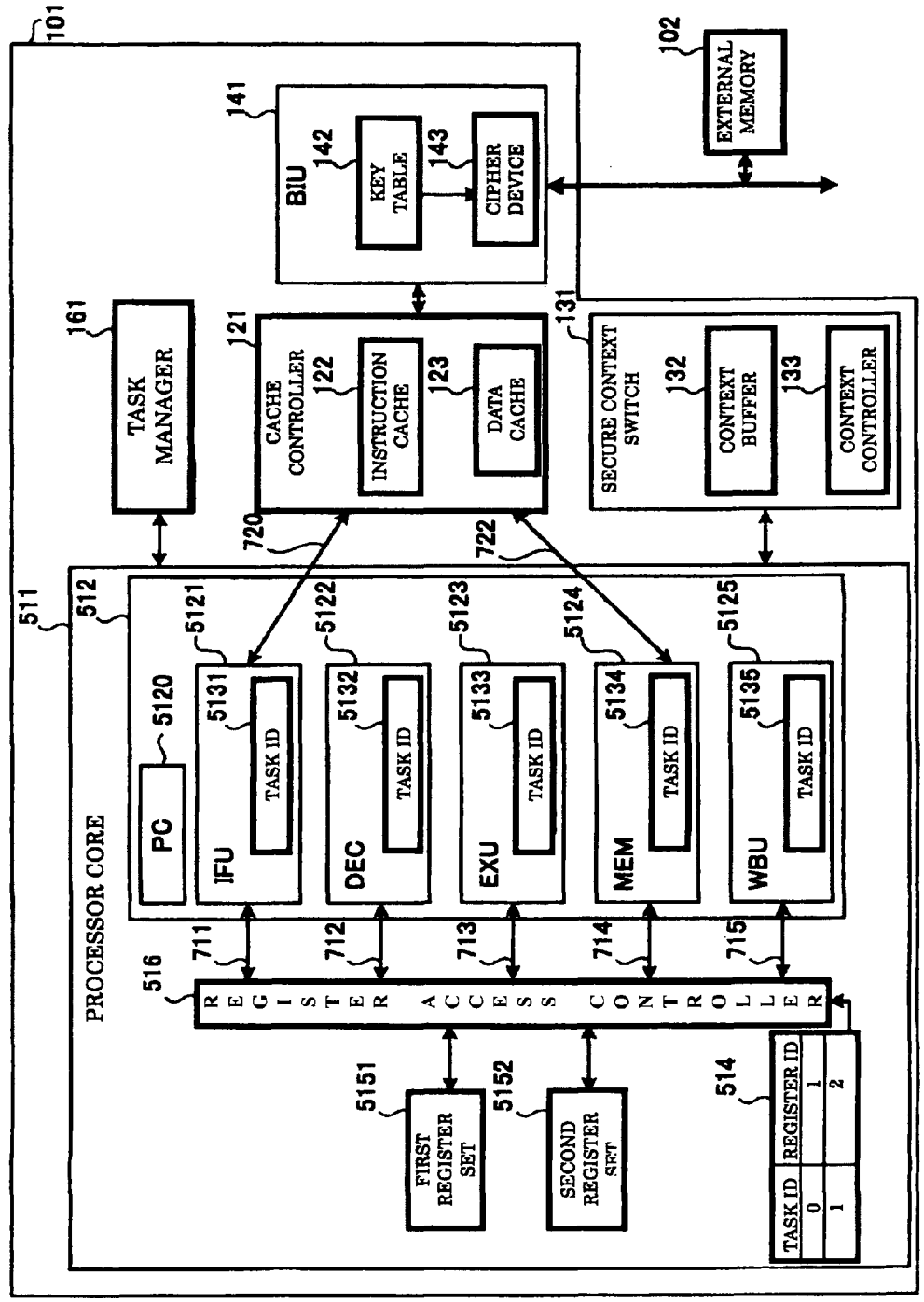
FIG. 8 is a block diagram showing the configuration of a processor core 511 according to some embodiments.

The processor 101 according to other embodiments will now be described. FIG. 8 is a block diagram showing the configuration of a processor core 511 according to such other embodiments.

The processor core 511 includes a 5-stage pipeline 512, a first register set 5151, a second register set 5152, a register access controller 516 and a register set table 514.

The 5-stage pipeline 512 includes a program counter 5120 that holds an address of an instruction fetch destination, an instruction fetch unit 5121, a decode unit 5122, an execution unit 5123, a memory access unit 5124 and a writeback unit 5125. Further, the units 5121 to 5125 have task ID registers 5131 to 5135, respectively. The task ID registers 5131 to 5135 have ID information of tasks that are being executed by the units 5121 to 5125, respectively.

The units 5121 to 5125 are connected to the register access controller 516 via buses 711 to 715, respectively. Further, the instruction fetch unit 5121 and the memory access unit 5124 are connected to a cache controller 121 through buses 720 and 722, respectively.

The register set table 514 holds task IDs and register IDs, which correspond to each other. In this case, the register ID refers to identification information to identify a register set. In the register set table 514 according to the present embodiment, a register ID '1' to identify the first register set 5151 corresponds to a task ID '0'. Further, a register ID '2' to identify the second register set 5152 corresponds to the task ID '1'.

The register access controller 516 controls the units 5121 to 5125 to have access to the first register set 5151 and the second register set 5152, using the register set table 514. To be more precise, the access controller 516 receives an access request to the first register set 5151 and/or the second register set 5152 from each of the units 5121 to 5125 of the 5-stage pipeline 512. The register access controller 516 then specifies a task ID that is held in a task ID register of a unit of an access request source.

The register access controller 516 also specifies a register ID, which corresponds to a task ID, from the register set table 514. It then grants access to a register ID that is specified by the access request source. Further, the register access controller 516 prohibits access to register sets that do not correspond in the register set table 514.

This can prevent each task from having access to register sets other than a corresponding register set even through other tasks are executed in a plurality of the units.

Hereinafter, the process of the processor 101 in the case where an interrupt process is generated when a protected task 1 is executed in the 5-stage pipeline 512 will be described. In this case, a task ID of the protected task 1, i.e., a former task is referred to as '1', and a task ID of a latter task after an interrupt is generated is referred to as '0'. The latter task according to the interrupt is a task by an OS.

Figure 9:
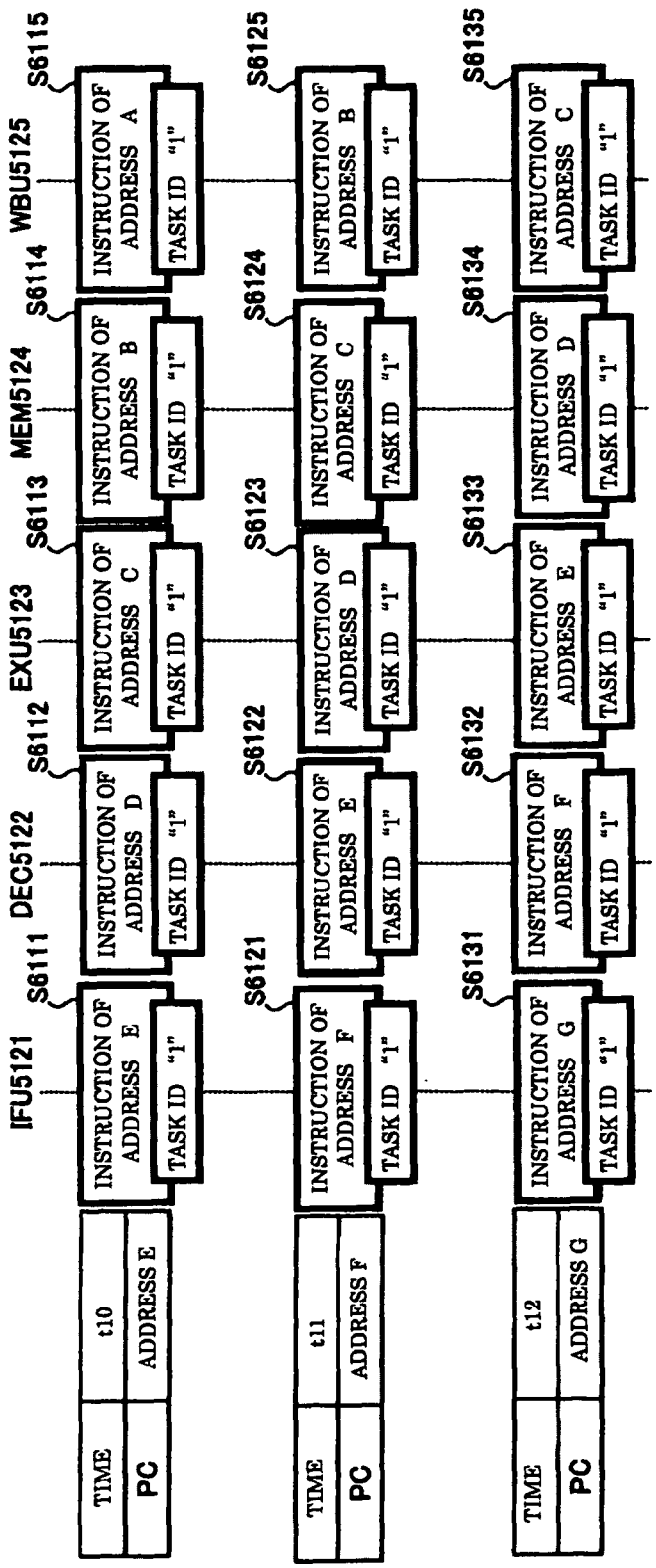
FIG. 9 is a diagram illustrating a state where the processor core 511 executes a first protected task.

FIG. 9 is a diagram illustrating a state where the processor core 511 executes the protected task 1. In the drawing, on the left side are shown values of the program counter 5120 at each time.

The processor core 511 first registers a task ID '0', which corresponds to an OS or a plain text, and a register ID '1' to identify the first register set 5151 in the register set table 514.

If the execution of the protected task begins, the task manager 161 sets '1' in the task ID register 5131 of the instruction fetch unit 5121. The task manager 161 further registers a task ID '1' and a register ID '2' to identify the second register set 5152 in the register set table 514.

At a time t10 shown in FIG. 9, the instruction fetch unit (IFU) 5121 sends a read request for an instruction of the protected task 1, which exists in the address E, to the cache controller 121, while referring to the value of the program counter 5120 (step S6111).

Hereinafter, the process performed by each of the units 5122 to 5125 in each of step S6112 to step S6115 is the same as that which is performed by each of the units 1122 to 1125 at the time t1, which has been described with reference to FIG. 5.

In step S6111, the instruction fetch unit 5121 requests instruction fetch to the cache controller 121 by using an address E and the task ID '1' of the protected task 1, which is held in the task ID register 5131 of the instruction fetch unit 5121, if the protected task 1 is executed.

The cache controller 121 reads the address E and an instruction corresponding to the task ID '1' from the instruction cache 122 or the external memory 102. It then sends the read instruction to the processor core 511 (step S6111, step S6121).

The read instruction and task ID are synchronized in the pipeline. For example, an instruction read from the instruction cache 122 is held in the instruction fetch unit 5121, and a task ID corresponding to a predetermined instruction is held in the task ID register 5131 of the instruction fetch unit 5121. Further, if a predetermined instruction transfers to the decode unit 5122, a task ID corresponding to the predetermined instruction also transfers to the task ID register 5132 of the decode unit 5122.

When the units 5121 to 5125 have access to the register sets 5151 and 5152, they execute an access request to the register access controller 516 using the values of the task ID register 5131 to 5135 of the units 5121 to 5125.

The register access controller 516 selects a corresponding register set from the register set table 514 and the task ID. That is, it selects the first register set 5151 or the second register set 5152. The register access controller 516 also executes an access request to the selected register sets 5151 and 5152.

Concretely speaking, for example, at the time t10, the register access controller 516 executes an access request to the register set 5151 or 5152 based on the value of the task ID register 5132 that exists in the decode unit, with respect to an access request from the decode unit 5122 (step S6112). Further, the register access controller 516 executes an access request to the register set 5151 or 5152 based on the value of the task ID register 5135 that exists in the writeback unit 5125, with respect to an access request from the writeback unit 5125 (step S6115).

As such, units 5121 to 5125 of the 5-stage pipeline 512 have access to the register access controller 516 using the values of the task ID registers 5131 to 5135, respectively. Therefore, even if register access is generated from other tasks when other tasks exist in the 5-stage pipeline 512, the units 5121 to 5125 can have access to the register sets 5151 and 5152 corresponding to respective tasks. It is therefore possible to prevent each task from having access to a register set to which access is not authorized.

Furthermore, when the units 5121 to 5125 have access to the cache controller 121, they notify values of the task ID registers 5131 to 5135 thereof, and execute an access request.

In particular, for example, at the time t10, the memory access unit 5124 notifies a task ID '1' in the memory access unit, and then has access to the cache controller 121 (step S6114).

As such, the units 5121 to 5125 of the 5-stage pipeline 512 have access to a cache controller using the values of the task ID register 5131 to 5135, respectively. Therefore, even though memory access is generated from other tasks when other tasks exist in the 5-stage pipeline 512, the cache controller 121 can perform access control using a task ID corresponding to each task. It is thus possible to prevent each task from having access to plain text data of a cache controller to which access is unauthorized.

As described above, while the protected task 1 is executed, each of the task ID registers 5131 to 5135 of units 5121 to 5125 hold a task ID '1' of the protected task 1. Then, access to the first register set 5151, which corresponds to the task ID '1' in the register set table 514, is granted.

Further, the instruction fetch unit 5121 and the memory access unit 5124 specify the task ID '1', and perform memory access. For example, at the time t10, the instruction fetch unit 5121 specifies the task ID '1' to the cache controller 121 through the bus 720, and then reads data of the address E (step S6111).

Furthermore, the memory access unit 5124 specifies the task ID '1' to the cache controller 121 through the bus 722, and then has access to the address B (step S6114).

In either case, in the event that the task ID '1' corresponds to an address, which is indicated by an access request in the cache controller 121, corresponding data are read. Further, in the case where a designated task ID does not correspond to an address that is indicated by an access request, access to the data is prohibited. This can prohibit each of the units to have access to data based on a task ID.

Figure 10:
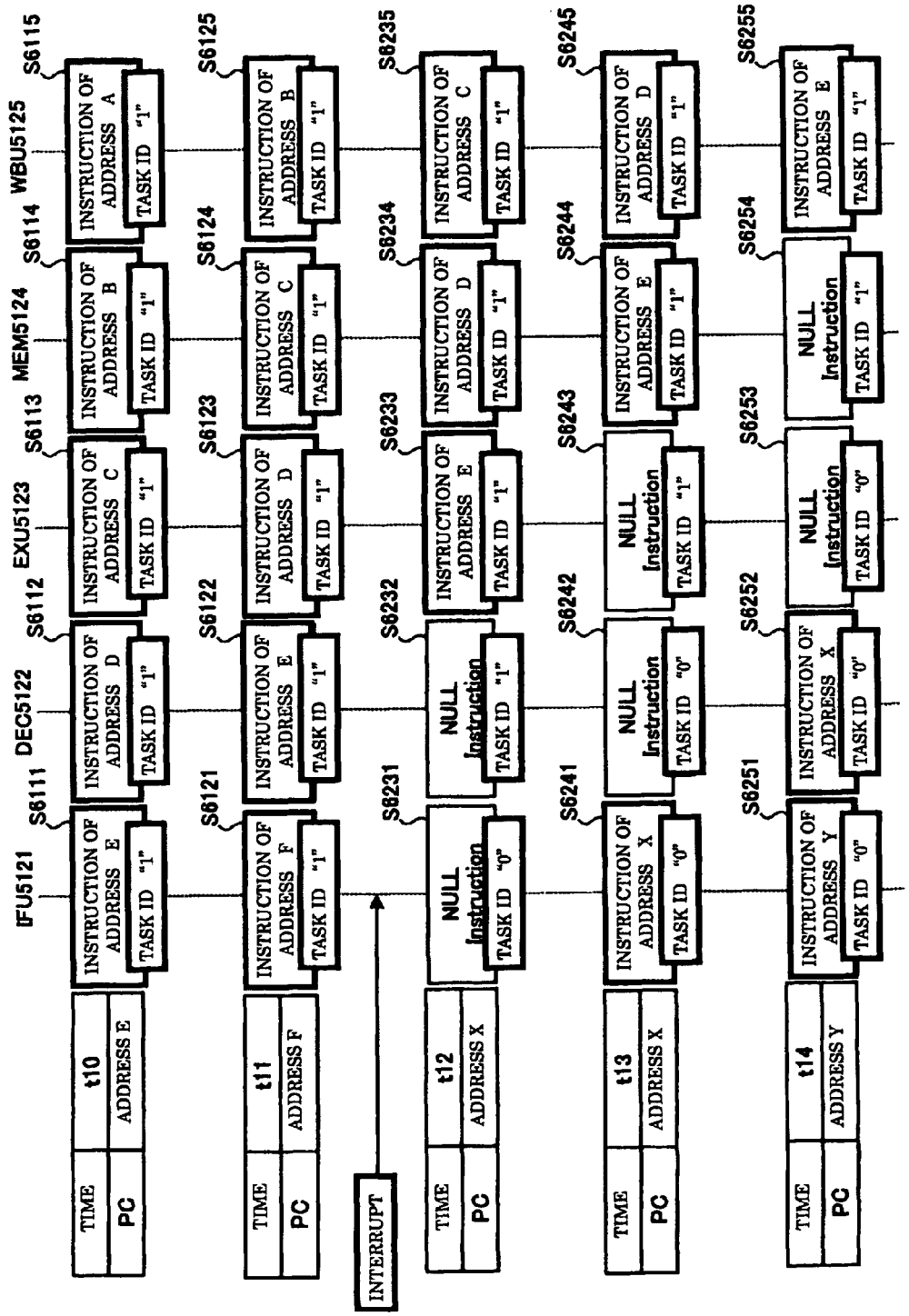
FIG. 10 is a diagram illustrating a state where the processor core 511 executes a task when an interrupt is generated.

FIG. 10 is a diagram illustrating a state where the 5-stage pipeline 512 executes a task when an interrupt is generated before a process at a time t12, which has been described with reference to FIG. 9, begins. In this case, the 5-stage pipeline 512 invalidates instructions of the instruction fetch unit 5121 and the decode unit 5122 (step S6231, step S6232). Further, the task manager 161 sets a task ID '0' in the task ID register 5131 of the instruction fetch unit 5121.

Figure 11:
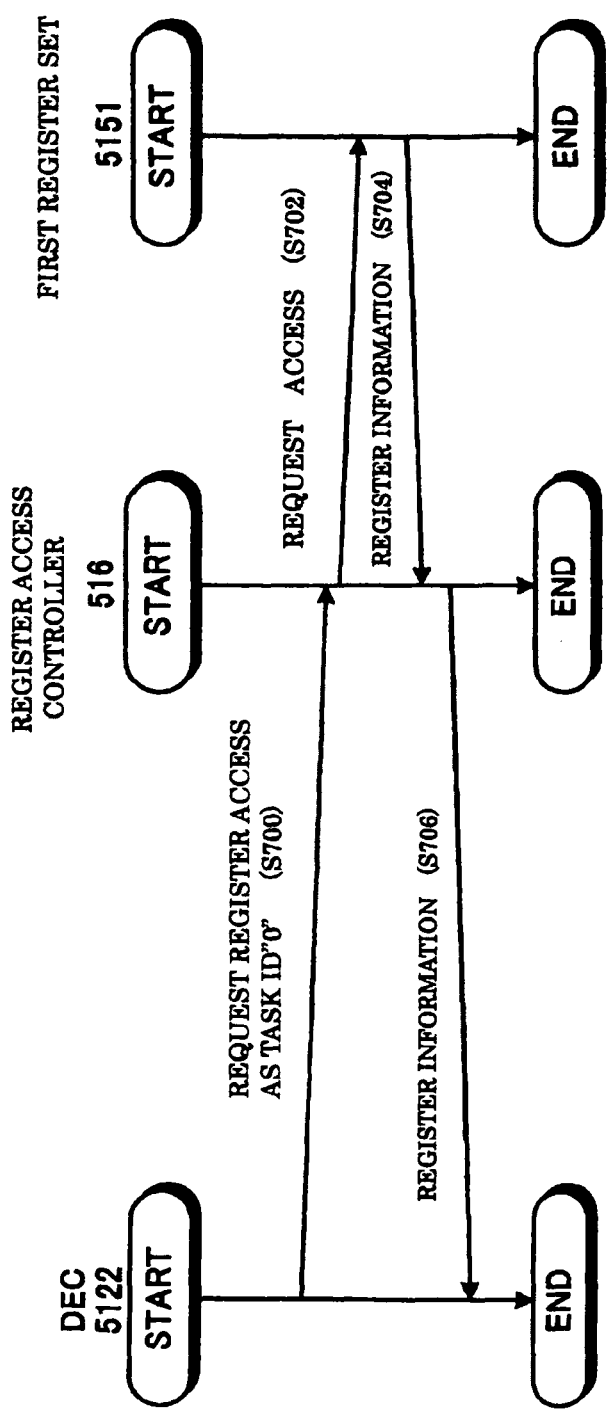
FIG. 11 is a flowchart illustrating a process in the case where a decode unit 5122 requests the register access control function 516 to read a register in step S6252 of FIG. 10.

FIG. 11 is a flowchart illustrating a process in the case where the decode unit 5122 requests the register access control function 516 to read a register in step S6252 of FIG. 10. In this case, an instruction of an OS task is decoded in the decode unit 5122. The task ID register 5132 in the decode unit 5122 is set to '0'. For this reason, the decode unit 5122 specifies a task ID '0' through the bus 712, and sends a register access request to the register access control function 516 (step S700).

If the register access request is received, the register access controller 516 specifies a register, which corresponds to the task ID '0' included in the register access request, from the register set table 514. That is, the register access controller 516 selects the first register set 5151. The register access controller 516 then reads the first register set 5151 (step S702). If register information is obtained from the first register set 5151 (step S704), the register access controller 516 sends the obtained register information to the decode unit 5122 (step S706).

Figure 12:
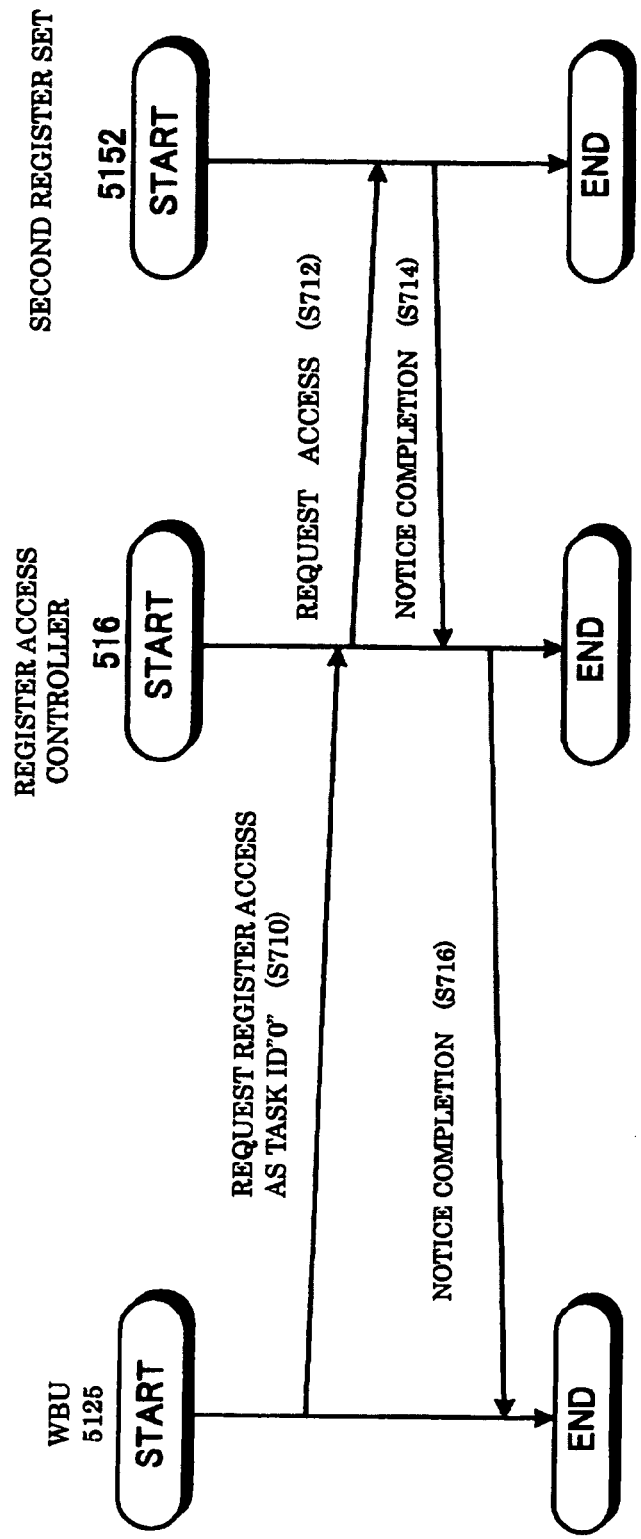
FIG. 12 is a flowchart illustrating a process in the case where a writeback unit 5125 requests the register access control function 516 to write in a register in step S6245 at a time t13 of FIG. 10.

FIG. 12 is a flowchart illustrating a process in the case where the writeback unit 5125 requests the register access controller 516 to write in a register in step S6245 at the time t13 of FIG. 10. At this time, an instruction of the protected task 1 is executed in the writeback unit 5125, and the task ID register 5135 in the writeback unit 5125 is set to '1'. The writeback unit 5125 sends a register access request, which designates the task ID '1' set in the task ID register 5135 of the writeback unit 5125, to the register access controller 516 via the bus 715 (step S710).

If the register access request is received, the register access controller 516 specifies a register, which corresponds to the task ID '1' included in the register access request, from the register set table 514. That is, it selects the second register set 5152. The register access controller 516 then executes a write request to the second register set 5152 (step S712).

If the write operation is completed, the second register set 5152 sends a completion notice to the register access controller 516 (step S714). The register access controller 516 then sends the completion notice to the decode unit 5122 (step S716).

As such, since the decode unit 5122 holds the task ID '0', it can have access to the first register set 5151 corresponding to the task ID '0' in the register set table 514. However, the decode unit 5122 cannot have access to the second register set 5152. Further, since the writeback unit 5125 maintains the task ID '1', it can have access to the second register set 5152 corresponding to the task ID '1' in the register set table. However, the writeback unit 5125 cannot have access to the first register set 5151. As such, access to the first register set 5151 and the second register set 5152 by each of the units is controlled according to a value of a task ID held in a task ID register of each of the units. It is thus possible to prevent other tasks from having access to register information.

Figure 13:
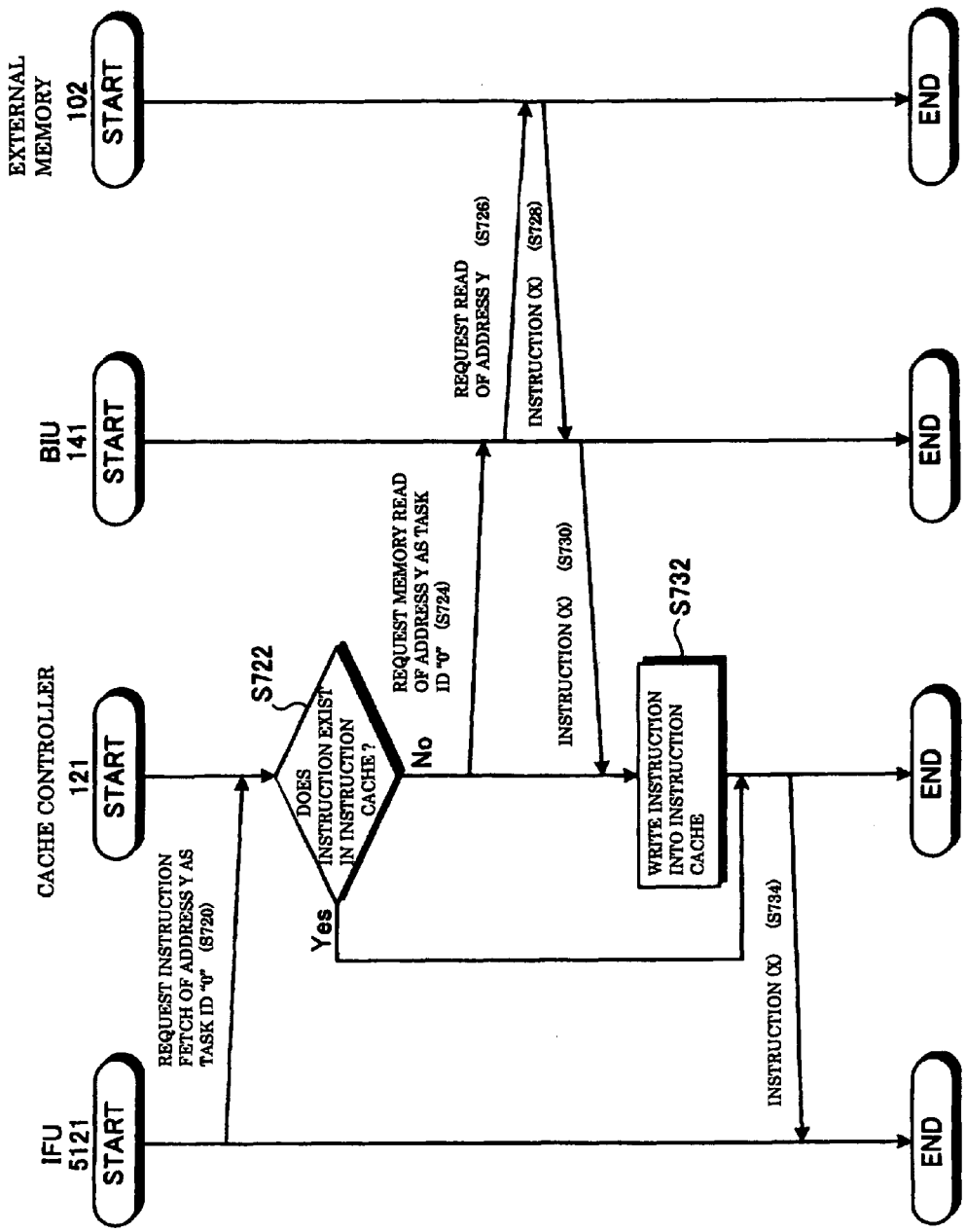
FIG. 13 is a flowchart illustrating a process in the case where an instruction fetch unit 5121 executes instruction fetch in step S6241 at the time t13 of FIG. 10.

FIG. 13 is a flowchart illustrating a process in the case where the instruction fetch unit 5121 executes instruction fetch in step S6241 at the time t13 of FIG. 10. At this time, an instruction of an OS task is being executed in the instruction fetch unit 5121, and the task ID register 5131 in the instruction fetch unit 5121 is set to '0'. The instruction fetch unit 5121 specifies a task ID '0' to the cache controller 121 through the bus 720, and executes an access request to an address Y (step S720).

If the access request is received, the cache controller 121 searches the instruction cache 122 for instructions to which access is requested. If the address Y and an instruction corresponding to the task ID '0' are not held in the instruction cache 122 (step S722, No), the cache controller 121 specifies the address Y and the task ID '0' to the BIU 141, and executes a memory access request (step S724).

The BIU 141 sends a read request for an instruction corresponding to the address Y to the external memory 102 (step S726). The BIU 141 obtains an instruction from the external memory 102 (step S728), and then sends the obtained instruction to the cache controller 121 (step S730).

In the present embodiment, an instruction corresponding to the task ID '0' in the key table 142 is a plain text instruction that is not encrypted, and is stored in the external memory 102. Thus, the instruction is sent to the cache controller 121 without being decrypted by the cipher device 143. Furthermore, if an instruction corresponding to a task ID is stored in the external memory 102 with it being encrypted, the cipher device 143 decrypts the encrypted instruction, and sends the decrypted instruction to the cache controller 121 as a plain text instruction.

The cache controller 121 writes the instruction, which is received from the BIU 141, into the instruction cache 122 (step S732). The cache controller 121 then sends the instruction read from the instruction cache 122 to the processor core 511 (step S734).

Meanwhile, if it is determined that an instruction to which access is requested is stored in the instruction cache 122 (step S722, Yes), the process proceeds to step S734.

Figure 14:
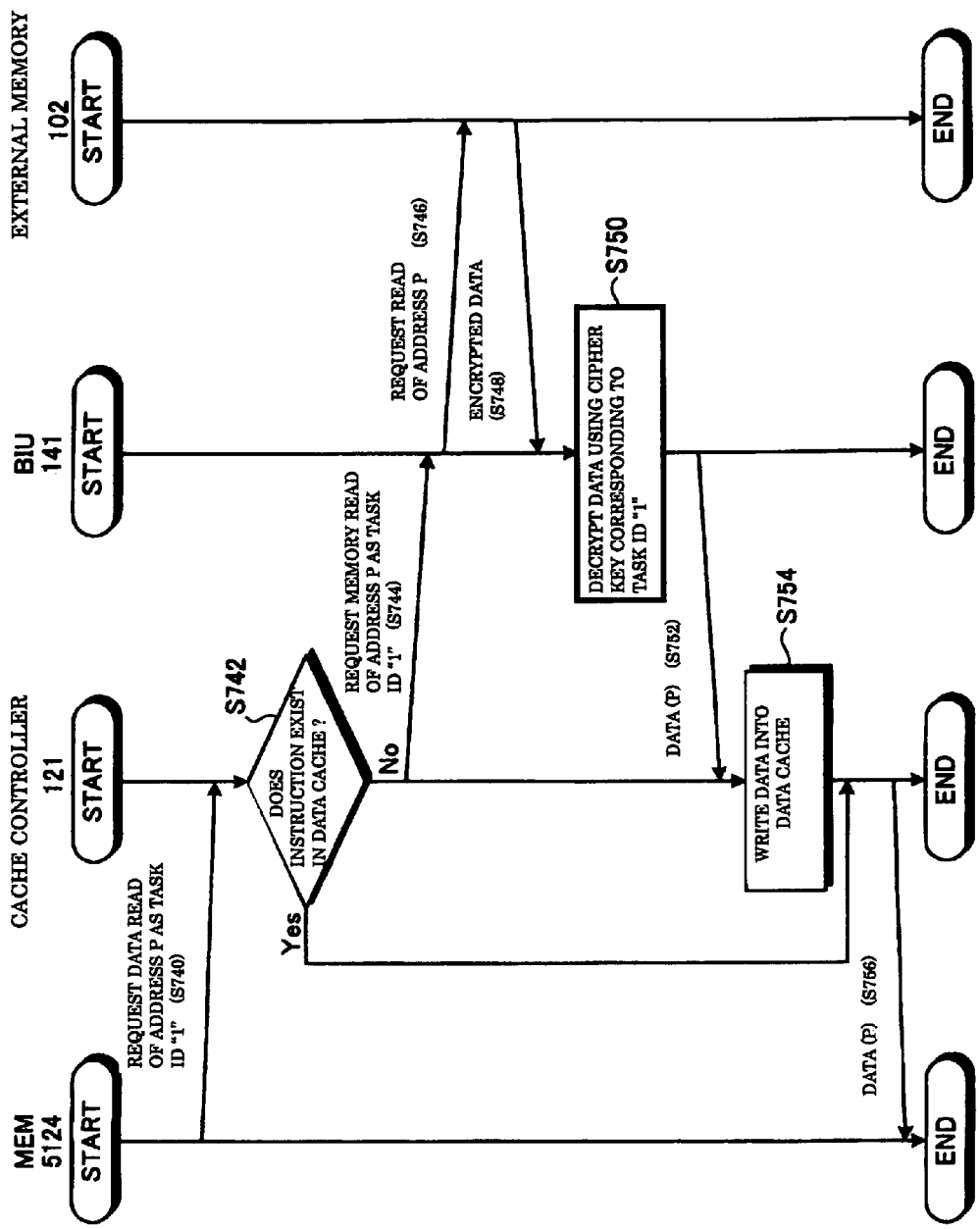
FIG. 14 is a flowchart illustrating a process in the case where a memory access unit 5124 executes memory access in step S6244 at the time t13 of FIG. 10.

FIG. 14 is a flowchart illustrating a process where the memory access unit 5124 executes memory access in step S6244 at the time t13 of FIG. 10. At this time, an instruction of the protected task 1 is being executed in the memory access unit 5124, and the task ID register 5134 in the memory access unit 5124 is set to '1'. The memory access unit 5124 specifies the task ID '1' to the cache controller 121 through the bus 722, and executes an access request to an address P (step S740).

If the access request is received, the cache controller 121 searches the data cache 123 for data to which access is requested. If it is determined that the address P and an data corresponding to the task ID '1' do not exist in the data cache 123 (step S742, No), the cache controller 121 designates the address P and the task ID '1' to the BIU 141, and executes a memory access request (step S744).

The BIU 141 sends a read request of data corresponding to the address P to the external memory 102 (step S746). The BIU 141 then obtains the encrypted data E[DATA (P)] corresponding to the address P from the external memory 102 (step S748). The BIU 141 selects a key corresponding to the task ID '1' from the key table 142.

The BIU 141 then decrypts the encrypted data E[DATA (P)], which is read from the cipher device 143, to obtain plain text decrypted data DATA(P) (step S750). The BIU 141 sends the obtained plain text data to the cache controller 121 (step S752).

The cache controller 121 writes the plain text data, which is received from the BIU 141, into the data cache 123 (step S754). The cache controller 121 then sends the plain text data to the processor core 511 (step S756).

Meanwhile, if it is determined that data to which access is requested is stored in the data cache 123 (step S742, Yes), the process proceeds to step S756. The process in step S6244 at the time t13 of FIG. 10 is thereby completed.

As such, since the instruction fetch unit 5121 has the task ID '0', it can have access to the cache controller 121 using the task ID '0'. Furthermore, since the memory access unit 5124 has the task ID '1', it can have access to the cache controller 121 using the task ID '1'. The cache controller 121 controls access to an instruction of a plain text or data according to a value of a task ID. It is thus possible to prevent other tasks from having access to an instruction of a plain text or data.

Further, in some embodiments, before a former task that is already registered in the 5-stage pipeline 512 before a generated interrupt is completed, the execution of a latter task after the interrupt is generated can begin. This results in improved responsiveness and throughput.

Furthermore, it has been described that a task ID register of each of units has a task ID of a task that is processed by each of the units. It is, however, to be understood that a task ID register of each of units can have a register ID of an access destination of a task that is being processed by each of the units. In this case, in order to specify a task ID upon memory access, it is necessary to have a task ID table containing register IDs and task IDs. Furthermore, a task ID is selected from a corresponding table of a register ID of each of the units and its task ID, and access to a memory is performed. Even in this case, in the same manner, it is possible to control access to registers or memories by each of the units.

Additional advantages and modifications will readily occur to those skilled in the art. Therefore, the invention in its broader aspect is not limited to the specific details and representative embodiments shown and described herein. Accordingly, various modifications may be made without departing from the spirit or scope of the general inventive concept as defined by the appended claims and their equivalents.

What is claimed is:

1. A microprocessor configured to execute programs in a pipeline architecture, comprising:
    a plurality of units configured to execute tasks;
    a task register of a plurality of task registers, the task register configured to hold register information that is used while the plurality of units executes the tasks;
    a task identification information register configured to hold task identification information, which identifies the task executed by each of the units, in a data format that is used to identify a corresponding unit;
    a task identification information specifying device configured to specify the task identification information that is held in the task identification information register for the units, if an access request to the register information is received from the units;
    a register table configured to hold a register information identifier and the task identification information, wherein the register information identifier is used to identify the register information held in the task register; and
    a controller configured to:
        control access to the register information that is held in the task register, based on the task identification information specified by the task identification information specifying device;
        prohibit the units corresponding to task identification information other than previously set task identification information from having access to the task register, according to the register information held in the task register; and prohibit the task register that holds register information from accessing other register information, which is identified by the register information identifier corresponding to the task identification information in the register table.

2. The microprocessor of claim 1, further comprising a register table setting device configured to set the register information identifier and the task identification information in the register table, wherein the register table holds the task identification information and the register information identifier set by the register table setting device.

3. A microprocessor configured to execute programs in a pipeline architecture, comprising:

a plurality of units configured to execute tasks;

a memory configured to store information which is used while the plurality of units execute the tasks;

a register information identification register configured to hold a register information identifier, which identifies a register set used by each of the units, in a data format that is used to identify a corresponding unit;

a register information identification specifying device configured to specify the register information identifier that is held in the register information identification register for the units, if a predetermined processing request is received from the units;

a task identification information table setting device configured to hold task identification information and a task register in a corresponding manner;

a task identification information table configured to hold the register information identifier and the task identification information in a corresponding manner;

a task identification information specifying unit configured to specify the task identification information corresponding to the register information identifier in the task identification information table, if an access request to the memory is received from the units; and a controller configured to control memory access using the task identification information specified by the task identification information specifying unit based on the register information identification specified by the register information identification specifying device.

4. A method, comprising:

executing tasks at a plurality of units;

holding, in a task register of a plurality of task registers, register information that is used while the plurality of units executes the task;

holding, in a task identification information register, task identification information, which identifies the task executed by each of the units, in a data format that is used to identify a corresponding unit;

holding, in a register table, a register information identifier and the task identification information, wherein the register information identifier is used to identify the register information held in the task identification information register;

specifying, in a task identification information specifying device, the task identification information that is held in the task identification information register for the units, if an access request to the register information is received from the units;

controlling, in a controller, access to the register information that is held in the task identification information register based on the task identification information specified by the task identification information specifying device;

prohibiting, at the controller, the units corresponding to task identification information other than the previously set task identification information from having access to the task register, according to the register information held in the task register; and prohibiting, at the controller, access to the task identification information register that holds register information other than the register information, which is identified by the register information identifier corresponding to the task identification information in the register table.

5. The method of claim 4, further comprising setting, at a register table setting device, the register information identifier and the task identification information in the register table, wherein the register table holds the register information identifier set by the register table setting device, and the task identification information in a corresponding manner.

6. A method, comprising:

executing tasks at a plurality of units;

storing, in a memory, information which is used when the plurality of units executes the tasks;

holding, in a register information identification register, a register information identifier, which identifies a register set used by each of the units, in a data format that is used to identify a corresponding unit;

holding the task identification information and the task register in a corresponding manner;

holding, in a task identification information table, the register information identifier and the task identification information in a corresponding manner;

specifying the register information identifier that is held in the register information identification register for the units, if a predetermined processing request is received from the units;

specifying, at a task identification information specifying unit, the task identification information corresponding to the register information identifier in the task identification information table, if an access request to the memory is received from the units; and controlling, at a controller, memory access using the task identification information specified by the task identification information specifying unit based on the specified register information identifier.

* * * * *